US011449648B2

(12) United States Patent
Li et al.

(10) Patent No.: US 11,449,648 B2
(45) Date of Patent: Sep. 20, 2022

(54) METHOD OF DESIGNING AND FORMING A CHANNEL OF FLOW-TYPE THIN-WALL DRIP IRRIGATION BELT

(71) Applicant: CHINA AGRICULTURAL UNIVERSITY, Beijing (CN)

(72) Inventors: Yunkai Li, Beijing (CN); Peng Hou, Beijing (CN); Ji Feng, Beijing (CN); Zhifu Wang, Tangshan (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 187 days.

(21) Appl. No.: 16/960,898

(22) PCT Filed: Jan. 29, 2018

(86) PCT No.: PCT/CN2018/074420
§ 371 (c)(1),
(2) Date: Jul. 9, 2020

(87) PCT Pub. No.: WO2019/144397
PCT Pub. Date: Aug. 1, 2019

(65) Prior Publication Data
US 2020/0364384 A1    Nov. 19, 2020

(51) Int. Cl.
*G06F 30/17*    (2020.01)
*G06F 30/28*    (2020.01)
(Continued)

(52) U.S. Cl.
CPC ............. *G06F 30/17* (2020.01); *A01G 25/02* (2013.01); *G06F 30/28* (2020.01); *G06F 2111/10* (2020.01); *G06F 2113/08* (2020.01)

(58) Field of Classification Search
CPC ..... A01G 25/02; G06F 30/28; G06F 2111/10; G06F 2113/08; G06F 30/12; G06F 2119/22; G06F 30/20; G06F 30/17; Y02A 40/22
See application file for complete search history.

(56) References Cited

U.S. PATENT DOCUMENTS

| 4,572,756 A | * | 2/1986 | Chapin | .................... B29C 65/40 |
| | | | | 156/203 |
| 5,591,293 A | * | 1/1997 | Miller | ............... B29C 66/73711 |
| | | | | 156/218 |
| 10,330,559 B2 | * | 6/2019 | Edris | ........................ G01M 3/28 |

FOREIGN PATENT DOCUMENTS

| CN | 101712016 A | 5/2010 |
| CN | 101722118 A | 6/2010 |

(Continued)

OTHER PUBLICATIONS

International Search Report and Written Opinion from PCT/CN2018/074420 dated Sep. 18, 2018.

*Primary Examiner* — Steven W Crabb
(74) *Attorney, Agent, or Firm* — Calfee, Halter & Griswold LLP

(57) ABSTRACT

The present disclosure discloses design and forming method of a channel of flow-type thin wall drip irrigation belt. The method includes the steps of construction of a double-layer asymmetric channel structure, determination of a structure parameter control threshold and optimal value, design of water inlets and water outlets of the double-layer asymmetric channel structure, proposal of a machining method of a molding wheel matching the double-layer asymmetric structure and an optimization method of a flow-type drip irrigation belt molding process, material modification of a flow-type drip irrigation belt and design of a reasonable
(Continued)

formulation, realization the stereotype production of the flow-type drip irrigation belt, etc.

9 Claims, 8 Drawing Sheets

(51) Int. Cl.
*A01G 25/02* (2006.01)
*G06F 113/08* (2020.01)
*G06F 111/10* (2020.01)

(56) References Cited

FOREIGN PATENT DOCUMENTS

| | | |
|---|---|---|
| CN | 104646200 A | 5/2015 |
| CN | 106096179 A | 11/2016 |
| CN | 108268734 A | 7/2018 |
| EP | 2618650 A2 | 7/2013 |

* cited by examiner (a)

(b)

(c)

(a)

(b)

(c)

(a)

(b)

(c)

METHOD OF DESIGNING AND FORMING A CHANNEL OF FLOW-TYPE THIN-WALL DRIP IRRIGATION BELT

CROSS-REFERENCE TO RELATED APPLICATION

This application is the United States national phase of International Application No. PCT/CN2018/074420 filed on Jan. 29, 2018, the disclosure of which is hereby incorporated in its entirety by reference.

FIELD OF THE DISCLOSURE

The present disclosure belongs to the field of agricultural water-saving irrigation technologies, and specifically relates to a design and forming method of a channel of flow-type thin wall drip irrigation belt for an irrigator product.

BACKGROUND OF THE DISCLOSURE

Drip irrigation is one of the most water-saving and efficient irrigation technologies at present, has broad application prospects, and has become an important way for modern agriculture to achieve water saving and efficient production. However, the proportion of drip irrigation around the world is low, mainly because the costs of drip irrigation systems are high, which is a great challenge for agriculture with low yield.

Irrigators are mostly used in the drip irrigation systems. Most of the irrigators need to be replaced every year, so the cost of use is high.

SUMMARY OF THE DISCLOSURE

The present disclosure provides a design and forming method of a channel of flow-type thin wall drip irrigation belt, the method including the following steps: 1, construction of a double-layer asymmetric channel structure and determination of control thresholds and optimal values of structure parameters; 2, design of water inlets and water outlets of the double-layer asymmetric channel structure; 3, proposal of a machining method of a molding wheel matching the double-layer asymmetric channel and optimization of a flow-type drip irrigation belt molding process; 4, material modification of a flow-type drip irrigation belt and design of a reasonable formulation; and 5, realization the stereotype production of the flow-type drip irrigation belt, wherein the step 1 includes model simulation and solution, construction of an optimal channel structure, and determination of control thresholds and optimal values of channel structure parameters; the step 2 includes design of self-cleaning water inlets and anti-negative suction water outlets; and the step 3 includes structural improvement of the molding wheel and calculation of groove channel structure parameters thereof, and determination of positions of vacuum adsorption points of the groove channel.

In some embodiments, the construction of the optimal channel structure in the step 1 includes arc optimization on tooth tips of the channel structure and other structural abrupt change portions; the construction of the optimal channel structure further includes construction of a double-layer asymmetric channel structure, that is, the arc-optimized channel structure is simulated by a numerical simulation method, the turbulence distribution is compared and the average turbulent kinetic energy is calculated, the channel structure with maximum turbulent region and average turbulent kinetic energy is selected, and two identical optimal channel structures are constructed as upper and lower structures, aligned on left and right and offset by ¼-½ of the channel width.

In some embodiments, the determination of control thresholds and optimal values of channel structure parameters in the step 1 includes comparison using a numerical simulation method to select the parameters of a unit segment of the inner wall of the sheared channel where the shear force is in the most unsuitable shear force interval (0-0.2 Pa∪0.4 Pa–∞) for growth of blocking matters and where the turbulence intensity is high as optimal channel structure parameters, where the range of tooth height H is 1.3-1.6 mm, the range of tooth angle θ is 50°-60°, the range of adjacent tooth pitch S is 1.8-2.1 mm, the range of channel width d is 0.8-1.2 mm, the range of channel length L is 27.5-42.5 mm, the range of channel depth w is 0-1 mm, and the left arc radius $R_0$ of the tooth tip, the right arc radius $R_1$ of the tooth tip, the arc radius $R_2$ of the tooth root are all not less than 0.2 mm.

In some embodiments, the tooth height H is 1.3 mm, the tooth angle θ is 60°, the adjacent tooth pitch S is 1.8 mm, the channel width d is 0.8 mm, the channel length L is 34.5 mm, the channel depth w is less than 0.8 mm, the left arc radius $R_0$ of the tooth tip is 0.4 mm, the right arc radius $R_1$ of the tooth tip is 0.2 mm, and the arc radius $R_2$ of the tooth root is 0.4 mm.

In some embodiments, the formation of self-cleaning water inlets in the step 2 includes formation of double layers of asymmetric water inlets, the offset direction and distance of the water inlets are partially consistent with the channel, each water inlet is ensured to be narrower than but as high as the channel, and the edges of the water inlets are not thermally sealed.

In some embodiments, the formation of anti-negative suction water outlets in the step 2 includes formation of size abrupt change structures at the water outlets, so that the cross-sectional area of the water outlets abruptly increases to reduce the occurrence of blockage caused by negative pressure.

In some embodiments, the structural improvement of a molding wheel in the step 3 includes addition of the same channel molding groove as the main channel to the side portion corresponding to the main channel of the molding wheel and adjustment of the degree of vacuum, thereby ensuring that the same channel is synchronously formed on one side wall corresponding to the main channel during molding; the calculation of groove channel structure parameters of the molding wheel in the step 3 includes construction of the structural size of a groove channel on the molding wheel, wherein the formula for calculating the structural size of a straight segment of the molding wheel channel is:

$$L_1 = L_2 \pm 2B$$

in the formula, $L_1$ is the length size of the straight segment of the molding wheel, $L_2$ is the length size of the straight segment of the channel, and B is the wall thickness of the drip tape;

the formula for calculating the structural size of an arc segment of the molding wheel channel is:

$$R_3 = \begin{cases} R_4 + B & R_4 > 0.2 \text{ mm} \\ 0.2 + B & R_4 < 0.2 \text{ mm} \end{cases}$$

in the formula, $R_3$ is the radius size of the arc segment of the molding wheel, R4 is the radius size of the arc segment of the channel, and B is the wall thickness of the drip tape.

In some embodiments, the determination of positions of vacuum adsorption points of the groove channel in the step 3 includes arrangement of the vacuum adsorption points at the positions where the turbulence intensity is high, that is, based on different radii of the arcs on the left and right sides of the tooth tip, the vacuum adsorption holes are arranged at the centers of the arcs on the left and right sides, and the molding precision of the tooth tip is ensured by asymmetric adsorption; and in order to ensure the molding precision of the arc of the tooth root, the center of the adsorption hole is close to the center of the arc of the tooth root.

In some embodiments, the material modification of a flow-type drip irrigation belt and the design of a reasonable formulation in the step 4 include addition of a toughening master batch POE to the materials to enhance the toughness, addition of an anti-UV agent to the materials to improve the aging resistance, and addition of a compatibilizer to improve the uniformity and workability of the materials.

In some embodiments, the compatibilizer is a maleic anhydride graft.

BRIEF DESCRIPTION OF THE ACCOMPANYING DRAWINGS

DETAILED DESCRIPTION OF THE PREFERRED EMBODIMENTS

Figure 1:
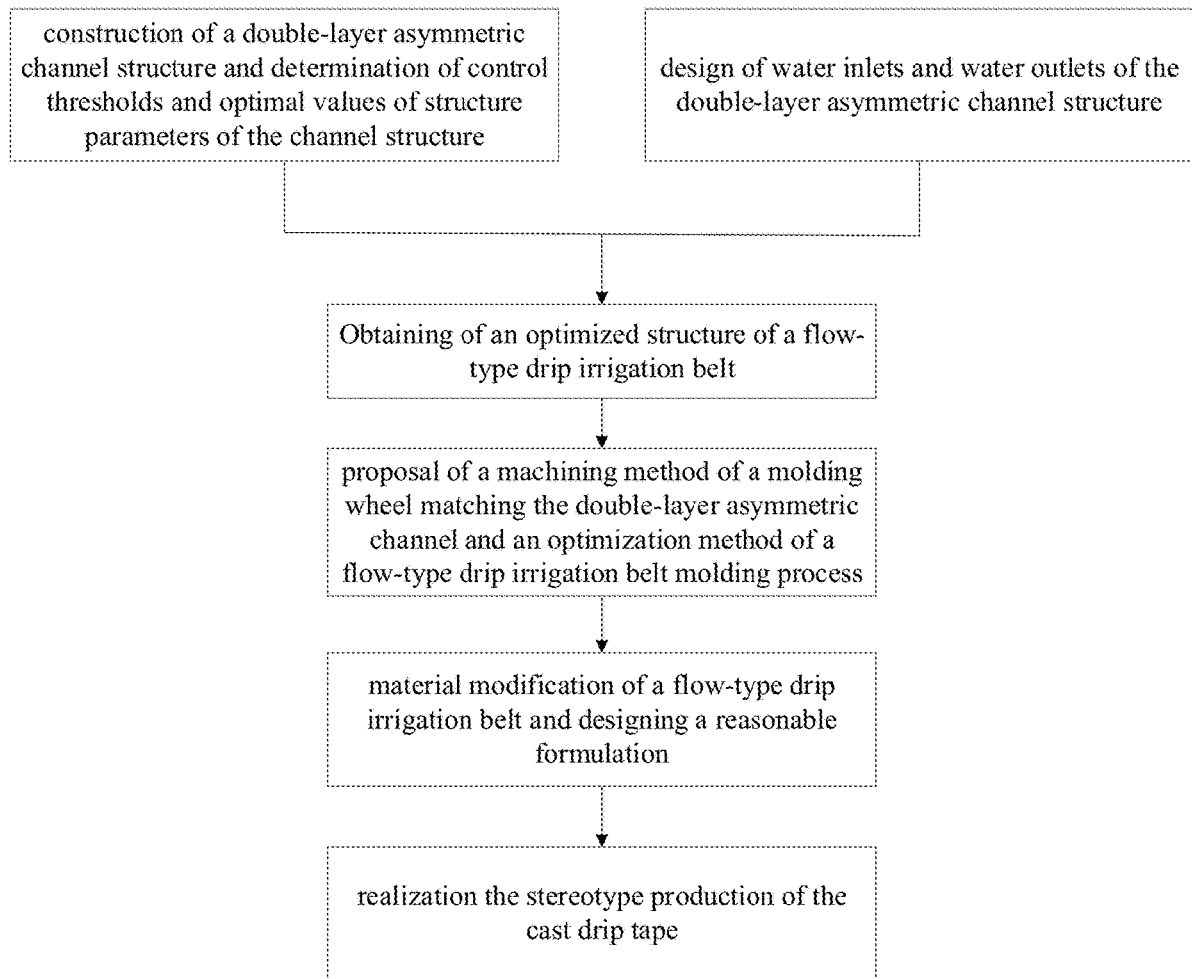
FIG. 1 is an overall flowchart of a design and forming method of a channel of flow-type thin wall drip irrigation belt according to the present disclosure.

To make the objectives, technical solutions and advantages of the present disclosure clearer, the technical solutions in the embodiments of the present disclosure will be described in more detail with reference to the accompanying drawings in the embodiments of the present disclosure. In the drawings, the same or similar signs throughout the drawings denote the same or similar elements or elements having the same or similar functions. Apparently, the embodiments described are some of, not all of the embodiments of the present disclosure. The embodiments described below with reference to the drawings and directional terms are exemplary, and are intended to interpret the present disclosure, but should not be understood as limiting the present disclosure. All other embodiments obtained by those of ordinary skill in the art based on the embodiments of the present disclosure without creative efforts shall fall within the protection scope of the present disclosure.

At present, disposable thin wall single-wing labyrinth irrigator products have been successfully developed by using an adsorption molding process to effectively reduce the system investment.

In fact, because of the limitations of the adsorption molding process and the lack of the irrigator design theory, the design of energy dissipating channels of the single-wing labyrinth irrigator products is simple (usually rectangular), resulting in poor hydraulic performance and blockage resistance of the irrigator products, and In some embodiments causing many blocking substances such as sediment particles remaining in the irrigator products after use, which greatly affects the machining performance and recyclable value of recycled irrigator products.

In related technologies, patent No.: ZL201130033265.9 discloses a flow-type drip irrigation belt product. Through vacuum absorption of forming wheel and crimping device, the pipe wall can be superposed with two layers of internal and external structure, so that when the water pressure reaches 1.5 times of working pressure or above, the gap between the two layers of pipe wall will be opened, and the blocked impurities in the channel will be cleaned. The price of the above continuous drip irrigation belt can be reduced to about 0.15 yuan/m, only 0.02-0.04 yuan/m higher than that of the single wing labyrinth thin wall drip irrigation belt, which has obvious price advantages compared with the chip emitter (generally more than 0.2 yuan/m), cylinder emitter (generally 0.8 yuan/m) and pressure compensation emitter (up to 2 yuan/m), while its performance is significantly higher than that of the single wing labyrinth. However, due to the absorption molding process, some complex structures are difficult to be processed. For example, in the process of absorption molding, the tip of the teeth will form a round corner, and the tip of the teeth is the main structure of energy dissipation, resulting in the reduction of hydraulic performance and anti-blocking performance, which is obviously inferior to the chip, cylinder and other emitters.

The development of the above flow-type thin wall drip irrigation belts provides an effective way to greatly reduce the system cost and maintain the hydraulic performance and blockage resistance, but how to achieve optimal design of flow-type drip irrigation belts and produce the designed products is an urgent problem to be solved at present. More importantly, because of the limitation of material formulation, it is found during the test of the flow-type drip irrigation belt presently produced that, because the material for the drip tape is deformed greatly, the channel is flattened when the pressure is high, resulting in slowing down of the outflow, where the flow tends to increase with the increase of pressure before 0.11 MPa, but decreases after 0.11 MPa, and even is zero at 0.16 MPa, and the compensation and self-cleaning functions are not reflected.

An energy dissipating channel is the core part of the irrigator, and some scholars have begun to explore the use of computational fluid dynamics to optimize the structure design of irrigators.

Application publication No.: CN106096179A discloses a design method of a drip irrigator channel structure and a fractal channel irrigator product thereof, which proposes a perfect solution for a sheet irrigator product, and provides an idea for developing products with excellent hydraulic characteristics and blockage resistance by means of control of internal flow characteristics. However, the products designed according to this method have high requirements for machining precision and cannot be used for the simple adsorption molding process. Therefore, the development of a channel design method and molding process suitable for flow-type thin wall drip irrigation belts is a problem that needs to be urgently solved at present.

Thus, the present disclosure proposes a design and forming method of a channel of flow-type thin wall drip irrigation belt, establishes a flow-type drip irrigation belt channel design method aiming at controlling the multiphase coupled flow inside an irrigator based on computational fluid dynamics (CFD) simulation technology, proposes a double-layer asymmetric channel structure suitable for a flow-type drip irrigation belt, optimal channel structure parameters and optimized structures of a water inlet and a water outlet, determines an adsorption molding process and molding wheel supporting the manufacturing of the product, and provides a suitable flow-type thin wall drip irrigation belt toughening and thinning method and a material modification formulation.

The present disclosure can effectively solve the following technical problems, and has the following beneficial effects:

1) By using CFD analysis technical means, a channel design method for controlling the internal solid-liquid-gas multi-field flow of a flow-type drip irrigation belt as a target is established, and control thresholds of channel structure design parameters of an adsorption molding process for the flow-type drip irrigation belt are determined, thereby solving the problems of long product development cycle and high cost caused by lack of the design theory for the flow-type drip irrigation belt channel, and adaptability of the channel design method and the adsorption molding process;

2) A double-layer asymmetric labyrinth channel structure suitable for the flow-type drip irrigation belt is proposed, optimal structure parameters are determined by multi-condition simulation analysis and step-by-step optimization, and upper and lower layers of self-cleaning water inlets and anti-negative pressure water outlets by increasing the outflow area are developed, thereby effectively solving the problems of instable outflow and inflow caused by the fact that the drip tape has large deformation and the extended portion of the inner wall blocks the upper layer of channel under the pressure of water flow; the asymmetric channel structure also reduces the production difficulty;

3) An improved adsorption molding process suitable for machining a flow-type thin wall drip irrigation belt with a double-layer asymmetric channel is constructed, a molding wheel with a double-row groove structure and a machining method of channel grooves thereof are determined, and optimized arrangement of adsorption points of the molding wheel are proposed, thereby effectively improving the machining precision of the adsorption molding process for the labyrinth channel, solving the problem of adsorption molding of the labyrinth channel with some complexity, and realizing rapid and accurate production;

A process and material formulation suitable for low deformation and tubular wall toughening and thinning of the flow-type thin wall drip irrigation belt are proposed; a toughening and thinning master batch (POE), a compatibilizer (maleic anhydride graft) and an antioxidant (anti-UV agent) are added to the material formulation of the conventional drip tape, thereby achieving synergistic enhancement of toughness, workability, uniformity and aging resistance of the drip tape, solving the problem of blockage caused by large deformation of channel inlets of flow-type drip irrigation belts, reducing the tubular wall to 0.125 mm, and reducing the cost to 0.15 yuan/m.

Based on the current situation of lack of design theory and production process for flow-type drip irrigation belt channels at home and abroad, the present disclosure proposes a design and forming method of a channel of flow-type thin wall drip irrigation belt, which promotes the design and development of flow-type drip irrigation belts at home and abroad.

As shown in FIG. 1, the present disclosure proposes a design and forming method of a channel of flow-type thin wall drip irrigation belt, the method mainly including the following steps:

1, construction of a double-layer asymmetric channel structure and determination of control thresholds and optimal values of structure parameters;

2, design of water inlets 11 and water outlets 21 of the double-layer asymmetric structure;

3, proposal of a machining method of a molding wheel 30 matching the double-layer asymmetric channel and optimization of a flow-type drip irrigation belt molding process;

4, material modification of a flow-type drip irrigation belt and design of a reasonable formulation; and 5, realization the stereotype production of the flow-type drip irrigation belt.

Figure 2:
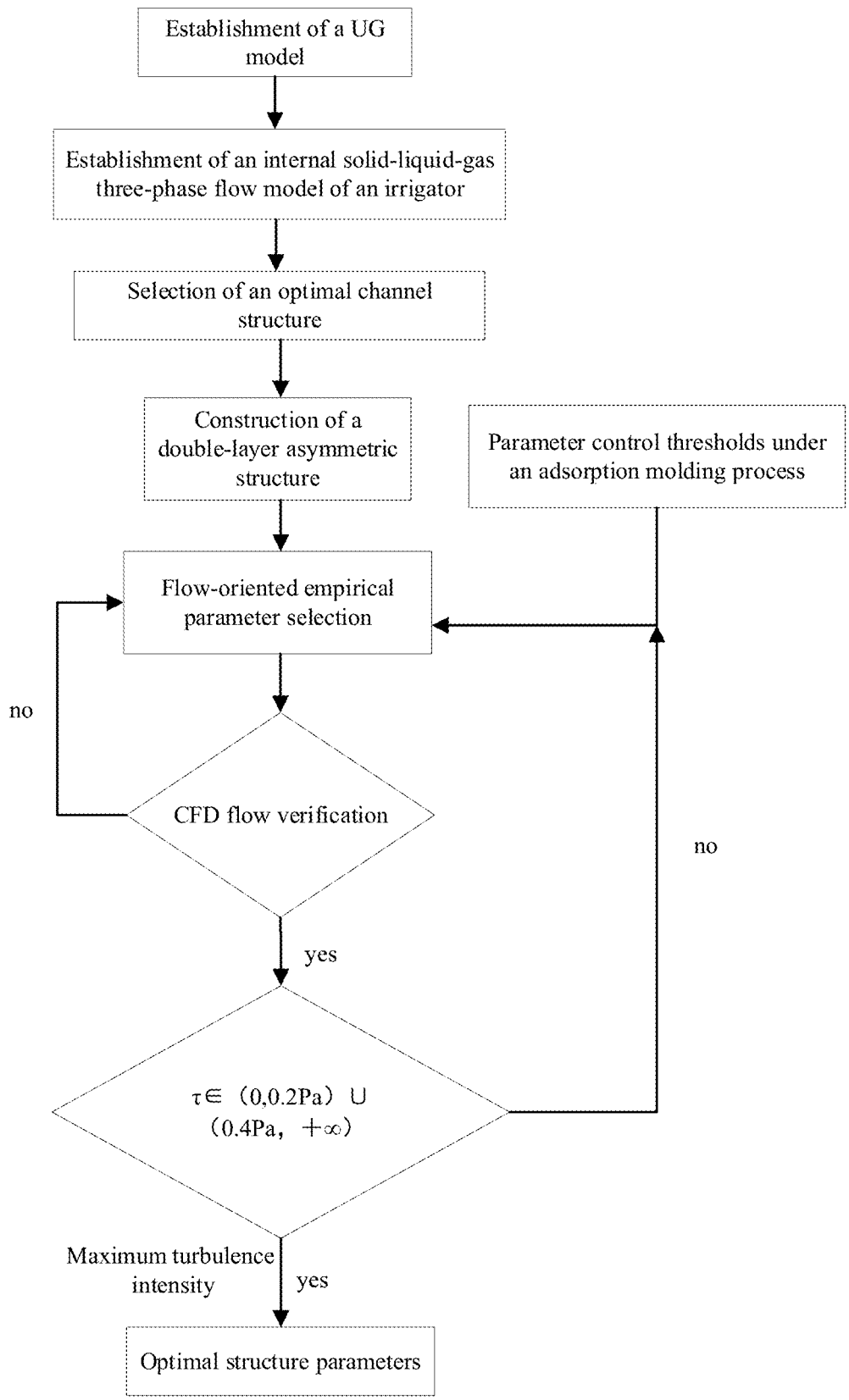
FIG. 2 is a flowchart of a cyclic step-by-step optimization design method of the channel of flow-type thin wall drip irrigation belt according to the present disclosure.

The above steps will be described in detail below, wherein
The step 1, as shown in FIG. 2, mainly includes the following steps:

1) Model Simulation and Solution Method

The model simulation and solution method mainly include three-dimensional modeling, grid division, and numerical simulation. Firstly, structure modeling is implemented by three-dimensional modeling software; secondly, grid division is performed on the established model; and finally, the divided grids are imported into numerical simulation software to implement internal visual analysis of the structure. The specific method is as follows:

Three-dimensional modeling: structure modeling is performed by software such as UG or solidworks, where three-dimensional modeling of various structures can be implemented by using of commands of sketching, stretching, boolean and the like. In addition, considering the manufacturing error of an adsorption molding process, fillets of different sizes are constructed at abrupt change positions of the structure by using a fillet command.

Grid division: the constructed structure is imported into an ICEM-CFD (integrated computer engineering and manufacturing code for computational fluid dynamics) for grid division of the channel. For comprehensive consideration of computational accuracy and computational time, the maximum size range of grids at the fluid portion of the channel is 0.1-0.4 mm, and the maximum size range of grids at water inlets 11 and water outlets 21 is 0.05-0.2 mm.

Numerical simulation: the established grids are imported into FLUENT software for visual simulation analysis of the inside of the channel, and optimal parameters in the simulation process are determined. Solid-liquid-gas three-phase flow simulation is carried out by the existing most widely used Standard k-ε model, RNG k-F model and LES model, and compared with the measured results obtained by particle image velocimetry, it is found that the optimal turbulence model is the RNG k-ε model, so the RNG k-ε turbulence model is used subsequently in the present disclosure for solid-liquid-gas three-phase flow simulation.

In addition, other parameters used mainly include: the finite volume method is used for discretizing the control equations for numerical calculation; a second-order upwind format is used for discretizing the parameters such as a convection term and so on; a SMPLE algorithm is used for solving the coupling of speed and pressure; in the selection of channel structures and optimal structure parameters, inlets are set as pressure inlets (0.1-0.2 MPa), outlets are set as pressure outlets (0 MPa).

Construction of an Optimal Channel Structure

Firstly, based on the molding error of an adsorption molding process for a sheet irrigator channel structure, arc optimization is performed on the channel structure, and an optimal channel structure under the adsorption molding process is determined by a CFD simulation method. By measuring the structures of multiple groups of channel units, it is found that fillets are produced at abrupt change positions of the structure, wherein the adsorption error at tooth tips is large, and the mean radius of the fillets formed at the tooth tips is about 0.2 mm. Since the tooth tips are main energy dissipating parts, their production accuracy is still needed to be ensured. Thus, the present disclosure proposes to provide two adsorption holes at the left and right asymmetrical positions of each tooth tip, that is, the left and right arcs of the tooth tip have different radii, so that the manufacturing accuracy of the tooth tips can be improved to a great extent by asymmetric adsorption. Since the radii of the adsorption holes are not less than 0.2 mm, the radii of the arcs of the tooth tips should not be less than 0.2 mm. For other abrupt change parts of the structure, when the radii of the arcs are more than 0.2 mm, the adsorption molding error is small, so 0.3-0.5 mm arc radii are selected for optimizing the other abrupt change parts of the structure.

Secondly, based on the above optimal channel structure, a double-layer asymmetric channel structure is constructed. The above arc-optimized channel structure is simulated by a numerical simulation method, the turbulence distributions are contrasted and the average turbulent kinetic energy is calculated, and the channel structure with maximum turbulent region and average turbulent kinetic energy is selected as the optimal channel structure. The two identical channel structures are constructed as upper and lower structures and aligned on left and right, and offset by ¼-½ of the channel width in front and back direction. The proportion of the overlap portion is ensured to guarantee the water outflow stability of the channel in a normal operating state and a self-cleaning state.

3) Determination of Control Thresholds and Optimal Values of Channel Structure Parameters After the above double-layer asymmetric structure channel is constructed, control thresholds and optimal values of channel structure parameters are further determined by using the model simulation and solution method of step 1).

Taking the arc-optimized toothed channel as an example, its structure parameters include adjacent pitch S, angle θ, channel width d, channel length L, tooth height H, left arc radius $R_0$ of the tooth tip, right arc radius $R_1$ of the tooth tip, arc radius $R_2$ of the tooth root, and channel depth w. The existing most widely used forecasting model for the toothed channel k is:

$$k = L^2 \times d^{1.5} \times w + \left(3.1 \times \frac{dL}{w} + 1.4\right)$$

Wherein, reference is made to control thresholds of a sheet toothed channel structure unit: the tooth height H is 1.3-1.6 mm, the tooth angle θ is 50°-60°, the adjacent tooth pitch S is 1.8-2.1 mm, the channel width d is 0.8-1.2 mm, the channel length L is 27.5-42.5 mm, and the channel depth w is 0-1 mm. For the arc radii of the tooth tip and the tooth root, in order to ensure the molding precision of the tooth tip, and considering that the radius of a vacuum adsorption hole is generally 0.18-0.23 mm, the arc radius of the tooth tip should be not less than 0.2 mm, and the arc radius of the tooth root is not less than 0.2 mm due to the limitations of the adsorption molding process.

Because the changes of structure parameters of the channel have little effect on the change in hydraulic performance parameter x of an irrigator, but have a significant impact on the blockage resistance of an irrigator, so based on the control target that the flow shear force of the inner wall of the irrigator channel is not in the most suitable shear force interval (0.2-0.4 Pa) for growth of blocking matters, a CFD simulation method is used for comparison to select the parameters of a unit segment as optimal channel structure parameters, in this unit segment, the shear force of the inner wall of the sheared channel is in the most unsuitable shear force interval (0-0.2 Pa∪0.4 Pa–∞) for growth of blocking matters, and the turbulence intensity is high. The flow is simulated and verified by CFD till meeting the design requirements. If multiple groups of data flows meet the requirements, the parameters of a unit segment are also selected as optimal channel structure parameters, in this unit segment, the shear force of the inner wall of the sheared channel is in the most unsuitable shear force interval (0-0.2 Pa∪0.4 Pa–∞) for growth of blocking matters, and the turbulence intensity is high.

After the optimal channel structure parameters are determined, the flow is calibrated by CFD simulation. If the flow deviation is within 5%, the selection is accepted. If the flow deviation exceeds 5%, the channel structure parameters are determined again.

The step 2 mainly includes the following contents:

1) Formation of Self-Cleaning Water Inlets 11

On the basis of a conventional straight-type water inlet of the flow-type thin wall drip irrigation belt, double layers of asymmetric water inlets 10 are formed, the offset direction and distance of the water inlets 11 are consistent with the channel part, and each water inlet 11 is ensured to be narrower than but as high as the channel. The edges of the water inlets 11 are not thermally sealed, and self-cleaning water inlets 11 are formed accordingly.

Figure 6:
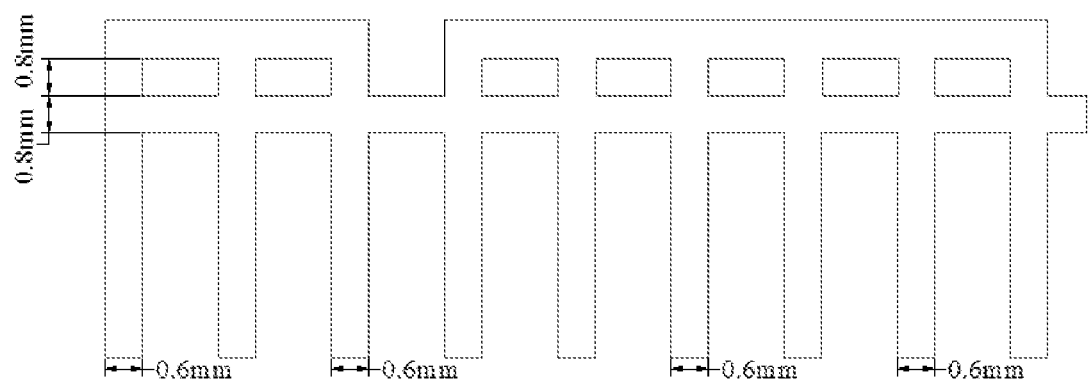
FIG. 6 is a schematic structural diagram of asymmetric water inlets of a flow-type thin wall drip irrigation belt with a double-layer asymmetric channel according to the present disclosure, where (a) is a top view, (b) is a left view, and (c) is a front view.
Figure 6:
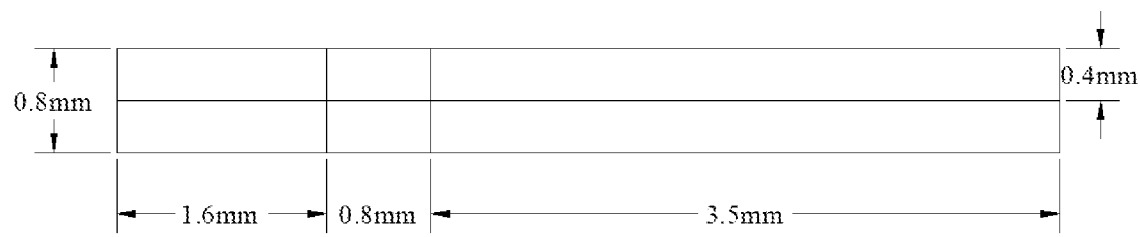
Figure 6:
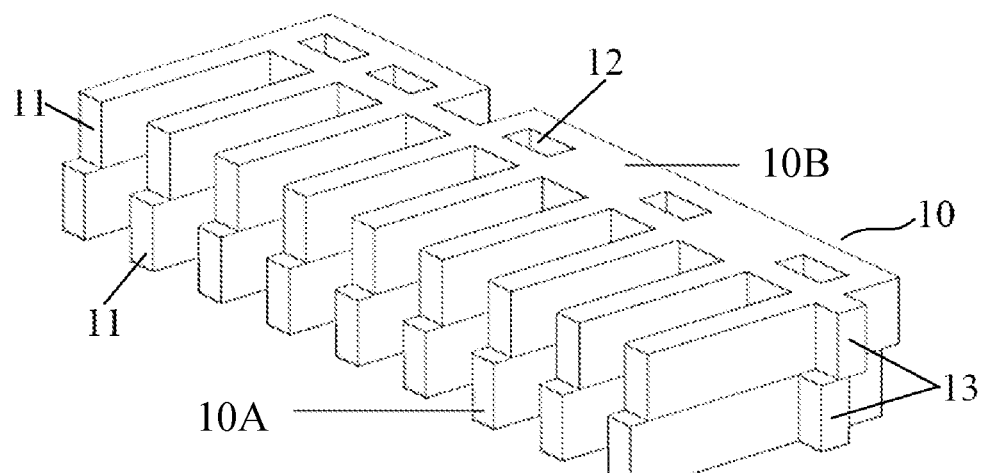

As show in FIG. 6(*c*), double layers of asymmetric water inlets 10 includes a lower-layer water inlets 10A and a upper-layer water inlets 10B, the water inlets 11 in each layer are arranged at interval, the water inlets 11 in the lower-layer water inlets 10A and the upper-layer water inlets 10B are communicated by a groove 12. And each layer of the water inlets 11 is connect with the channel by a connector 13 which is set at a side of the double layers of asymmetric water inlets 10.

After the above treatment, the outer wall and inner wall of the drip tape are of two separable layers at the water inlets 11. In the case of water pressure change, the inner wall can play a certain role of pressure compensation to adjust the outflow rate to some extent; when the water pressure reaches 1.5 times the operating pressure and above, the gap between the two layers of tubular walls is opened to clean impurities blocked in the channel, thereby realizing the pressure compensation and self-cleaning functions of the flow-type thin wall drip irrigation belt.

2) Formation of Anti-Negative Suction Water Outlets 21

Water outlets of the existing flow-type thin wall drip irrigation belt are generally straight, and located on the sides of the drip tape. When the water pressure changes during use, negative pressure is easily produced to suck dust particles back to the channel, causing blockage of the drip tape, thereby affecting the uniformity of irrigation.

In order to avoid the occurrence of such a problem, the present disclosure proposes a design of anti-negative suction water outlets 21, that is, size abrupt change structures are formed at the water outlets 21, so that the cross-sectional area of the water outlets 21 abruptly increases to reduce the occurrence of blockage of the drip tape caused by negative pressure.

As show in FIG. 7(c), double layers of asymmetric water outlets 20 includes a lower-layer water outlets 20A and a upper-layer water outlets 20B, the water outlets 21 in each layer are arranged at interval, the water outlets 21 in the lower-layer water outlets 20A and the upper-layer water outlets 20B are communicated by a groove 22. And each layer of the water outlets 21 is connect with the channel by a connector 23 which is set at a side of the double layers of asymmetric water outlets 20.

As show in FIG. 8(c), the step 3 mainly includes the following contents:

1) Structural Improvement of the Molding Wheel 30 and Calculation of Groove Channel 31 Structure Parameters Thereof.

Structural improvement of the molding wheel 30: the same channel molding groove as the main channel is added to the side portion corresponding to the main channel of the molding wheel 30 and the degree of vacuum is adjusted through an opening 32, which can ensure that the same channel is synchronously formed on one side wall corresponding to the main channel during molding.

Machining method of the channel groove: in order to achieve precise production, a groove channel structure on the molding wheel 30 needs to be constructed for the optimized channel structure. By repeated accurate measurement and comparison of the drip tape and the molding wheel channel, a construction model of the groove channel 31 of the molding wheel based on the drip tape channel is established.

The formula for calculating the structural size of a straight segment of the molding wheel channel is:

$$L_1 = L_2 \pm 2B$$

In the formula, $L_1$ is the length size of the straight segment of the molding wheel 30, $L_2$ is the length size of the straight segment of the channel, and B is the wall thickness of the drip tape.

The formula for calculating the structural size of an arc segment of the molding wheel channel is:

$$R_3 = \begin{cases} R_4 + B & R_4 > 0.2 \text{ mm} \\ 0.2 + B & R_4 < 0.2 \text{ mm} \end{cases}$$

In the formula, $R_3$ is the radius size of the arc segment of the molding wheel, $R_4$ is the radius size of the arc segment of the channel, and B is the wall thickness of the drip tape.

2) Determination of Positions of Vacuum Adsorption Points of the Groove Channel

When a sheet film that has not been cooled passes through the groove channel of the molding wheel 30, a vacuum pump provides vacuum and vacuum adsorption holes perform vacuum adsorption. The degree of vacuum is adjusted as needed to ensure that the labyrinth molded is full. It can be seen that the positions of adsorption points have a great impact on molding of the labyrinth. Therefore, a method of arranging vacuum adsorption points at the positions where the turbulence intensity is high is proposed.

Since the tooth tip is a main energy dissipating part, its molding precision should be ensured preferentially. Based on different radii of the arcs on the left and right sides of the tooth tip, the vacuum adsorption holes are arranged at the centers of the arcs on the left and right sides, and the molding precision of the tooth tip is ensured by asymmetric adsorption. In order to ensure the molding precision of the arc of the tooth root, the center of the adsorption hole is as close to the center of the arc of the tooth root as possible. The unknown improvement on the vacuum adsorption points can reduce the requirement of the channel for the precision of the molding process and enhance the energy dissipating effect.

3) Other Structural Improvements

Firstly, a device is added at a molding tractor to ensure accurate molding and stable water inflow of the flow-type thin wall drip irrigation belt of the present disclosure. A transport channel is added in front of a laminated heat-sealing device to ensure the position of a flanging center line, so as to ensure that the upper and lower channels have a position offset of ¼-½ channel width. Secondly, a hot crimping device is added in back of a trimming device to keep the wall edge of the inner channel always in an inward crimped state by means of heat, thereby keeping the water inlets 11 of the flow-type drip irrigation belt always open, and avoiding self-closure of the water outlets 21 due to excessive pressure of the water head.

4) Optimization of Flow-Type Drip Irrigation Belt Molding Process

In order to realize the production of the flow-type thin wall drip irrigation belt with the double-layer asymmetric channel of the present disclosure, a dedicated production process has been developed. The specific process is as follows:

A master batch for the drip tape is heated and extruded by an extruder to form a sheet membrane, and the sheet membrane enters the molding wheel 30 under the traction. Two corresponding labyrinth channel grooves are machined in the molding wheel 30, vacuum suction holes are formed at the bottoms of the grooves, and the membrane that has not been completely cooled is adsorbed onto the molding wheel 30 by vacuum to form corresponding labyrinth channels, water inlets 11 and water outlets 21. Cooling circulating water is introduced to the inside of the molding wheel 30, and the labyrinth sheet adsorbed is cooled simultaneously on the molding wheel 30 till being completely cooled and molded. After the molding wheel 30 is cooled, the sheet passes through a trimming recovery system to solve the problem of width fluctuation of the sheet in the high-speed production, and then passes through the lateral hot crimping device added in back of the casting trimming device to keep the heat-sealed outer portion of the inside drip tape in a crimped state. The labyrinth sheet is folded into a tubular shape by the flanging device. At this time, the channel structure is a double-layer asymmetric structure. After heat sealing, the drip tape is formed and rolled.

The step 4 mainly includes the following contents:

The conventional flow-type thin wall drip irrigation belt mainly includes four materials in percentage by weight: 87.5-89.5% of linear low density polyethylene (LLDPE, copolymer of ethylene and α-olefin), 2.0% of anti-aging agent (special anti-aging stabilizer for the drip tape), 1.0% of plastic cold-resistant softener (styrene terpolymer modifier), and 3.0% of black master batch. However, the drip tape under the material formulation has large deformation, and even when the pressure reaches 1.5 times the operating pressure, the outflow cannot be ensured, so the toughness and strength of the materials need to be enhanced. The drip tape with thin side walls is easily oxidized during use, resulting in a short service life. In addition, considering the addition of many novel materials in the material formulation, the production uniformity of the drip tape is reduced to some extent, so an antioxidant and a compatibilizer should be added.

Based on this, the present disclosure proposes a novel drip tape material.

Enhancement of toughness: a toughening master batch POE is added to the materials. POE plastic is a thermoplastic elastomer polymerized in situ by metallocene catalysts including ethylene and octene, and has the characteristics: 1) the soft-chain crimped structure of the octene and the crystallized ethylene chain serve as physical crosslinking points, so the POE plastic has excellent toughness and good workability; 2) the molecular structure of the POE plastic does not contain any unsaturated double bond, so the POE plastic has excellent aging resistance; 3) the POE plastic has a narrow molecular weight distribution, good flowability and good compatibility with polyolefin; and 4) the good flowability can improve the dispersion effect of the filler and also improve the weld line strength of the product. As the content of the POE plastic increases, the impact strength and elongation at break of the system are greatly improved. Hence, the POE plastic has excellent toughening effect on PP and PE, and has good compatibility with PE and active calcium carbonate. The molecular weight distribution of the POE plastic is narrow, the lateral octyl group in the molecular structure is longer than the lateral ethyl group, and junction points can then be formed in the molecular structure to play a role of coupling and buffering among the components, so that the system has the effect of dispersing and buffering the energy of impact when the system is impacted, the probability of development from silver streaks to cracks in the presence of force is reduced, and the impact strength of the system is improved accordingly. When the system is subjected to tension, the network-like structure formed by these junction points can produce large deformation, so the elongation at break of the system is significantly increased.

Improvement of aging resistance: the addition of an anti-UV agent to the materials prevents degradation of polymers during processing and prevents oxidation of the finished product during use. In addition, specific applications require special additive formulations, such as copper inhibitors associated with wire and cable applications. Moreover, the anti-UV additive addition can provide excellent weather resistance and UV (or sunlight) resistance, which fundamentally prolong the service life of PE pipes.

Improvement of material uniformity and workability: a compatibilizer needs to be added to the materials in order to blend the added materials uniformly into the master batch for making the drip tape, improve the compatibility of the composite materials, and improve the processing rheology.

The compatibilizer means to bond two incompatible polymers by means of intermolecular bonding force to obtain a stable blend agent, and here refers to a polymer compatibilizer.

The compatibilizer used in the present disclosure is a maleic anhydride graft. The maleic anhydride graft compatibilizer has high polarity and reactivity by introducing strong polar reactive groups, and is a polymer interface coupling agent, a compatibilizer and a dispersion accelerator. The compatibilizer can improve the properties of toughness, mechanical lightness and the like of the drip tape. Moreover, the compatibilizer can improve the compatibility of the inorganic filler with the organic resin, improve the tensile strength and impact strength of the product, achieve high filling, reduce the consumption of resin, improve the processing rheology, and improve the surface finish.

The step 5 mainly includes the following contents:

Three-dimensional setting of the irrigator is carried out based on the results obtained in the steps 1 to 4, a high-precision mold is finally developed according to user's application requirements, and key parameters of the drip tape such as materials and wall thickness are finally selected to realize industrialization of the new irrigator product.

The present disclosure will be described in more detail by way of a preferred embodiment.

Figure 3:
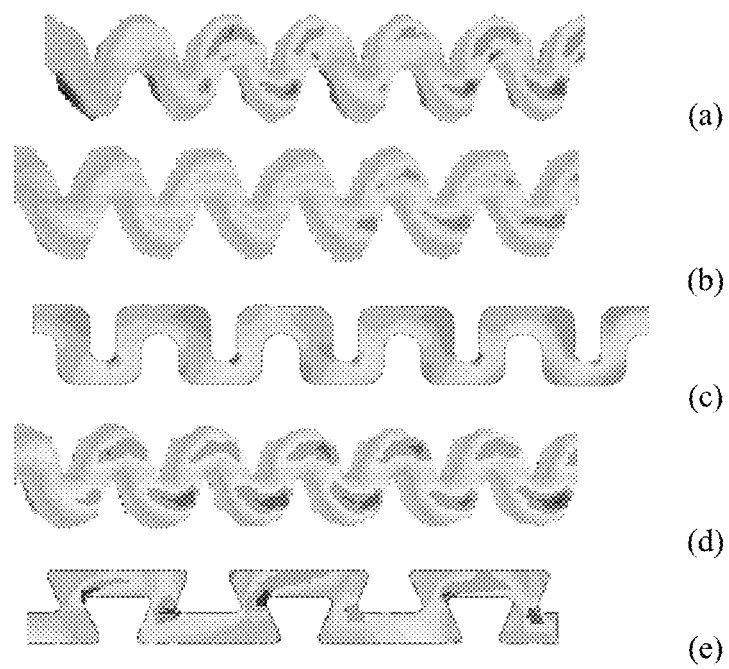
FIG. 3 is a schematic diagram of turbulence intensities of different structures of the channel of flow-type thin wall drip irrigation belt according to the present disclosure, wherein (a) is a trapezoidal channel, (b) is a triangular channel, (c) is a rectangular channel, (d) is a toothed channel, and (e) is an inverted tooth channel.

In this embodiment, a flow-type thin wall drip irrigation belt having a flow rate of 3 L/h and a double-layer asymmetric channel is produced by using the design and forming method of a channel of flow-type thin wall drip irrigation belt according to the present disclosure. The specific process is as follows:

1. Structure Design and Parameter Determination of the Double-Layer Asymmetric Channel 1) Selection of a Channel Structure In this embodiment, arc-optimized trapezoidal, triangular, rectangular, toothed, and inverted trapezoidal structures are simulated by a CFD simulation method, and the simulation results are shown in FIG. 3.

At the tooth tips of the trapezoidal and triangular channels, the corner position of the side wall of each inverted trapezoidal channel has obvious areas of lower turbulence intensity, and sediments are easily deposited at these areas to cause blockage of the irrigator. Through simulation experiments, the blockage resistance of the toothed channel is relatively high among the channel structures. The optimized tooth channel has the highest turbulence intensity and no corner area with great turbulence intensity. Therefore, the toothed channel is selected as the optimal channel under the adsorption molding process.

2) Determination of Unit Structure Parameters for Flow

Figure 4:
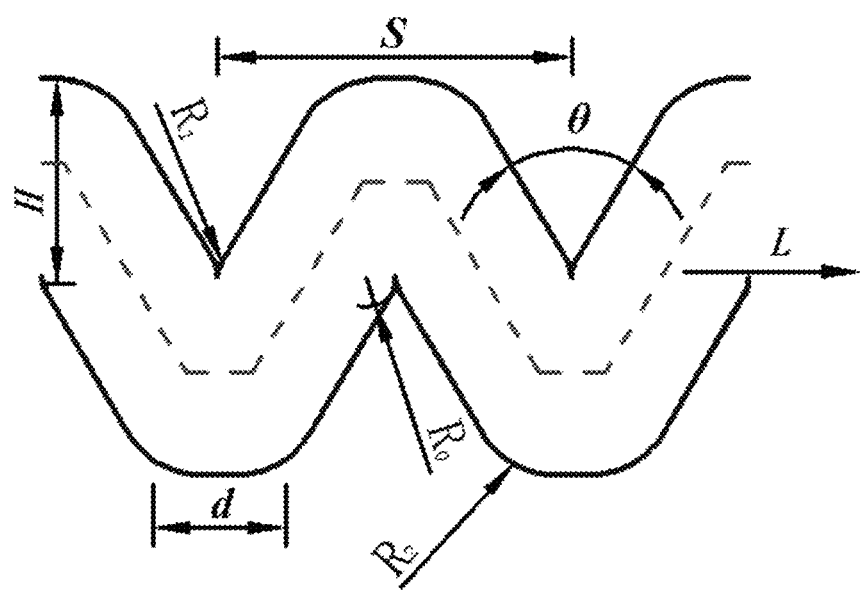
FIG. 4 is a schematic diagram of geometric parameters after improvement of the toothed channel of flow-type thin wall drip irrigation belt according to the present disclosure.

In this embodiment, the arc-optimized toothed channel structure may be derived from a toothed channel by fillet optimization, and its structure parameters are as shown in FIG. 4. For the three structure parameters including adjacent pitch S, tooth angle θ and tooth height H, reference may be made to the optimal design of a sheet toothed channel structure unit, that is, the tooth height H is 1.3 mm, the tooth angle θ is 60°, and the adjacent pitch S is 1.8 mm. In order to achieve the design of 3 L/h flow, it is finally selected by simulation comparison that the channel width d is 0.8 mm, the channel length L is 34.5 mm, and the channel depth w is less than 0.8 mm.

After the above structure parameters are determined, the structure parameters such as arc radii of tooth tips and tooth roots also need to be determined, wherein the right arc radii $R_1$ of the tooth tips are 0.2 mm, the left arc radii $R_0$ of the tooth tips are 0.3 mm and 0.4 mm respectively, and the arc radii $R_2$ of the tooth roots are 0.3 mm, 0.4 mm and 0.5 mm for comparison. Considering the symmetry of development of the vortex, a symmetrical design is used at the water-facing areas of the tooth tips and the water backing areas of the tooth roots, the water backing areas of the tooth tips and the water-facing areas of the tooth roots of channel units. It is finally found that when $R_0$=0.4 mm and $R_2$=0.4 mm, the shear force of the inner wall of the sheared channel is in the most unsuitable shear force interval for growth of blocking matters, the vortex develops more fully and the turbulence intensity is higher, so $R_0$=0.4 mm and $R_2$=0.4 mm are selected as the optimal sizes of the arcs.

Figure 5:
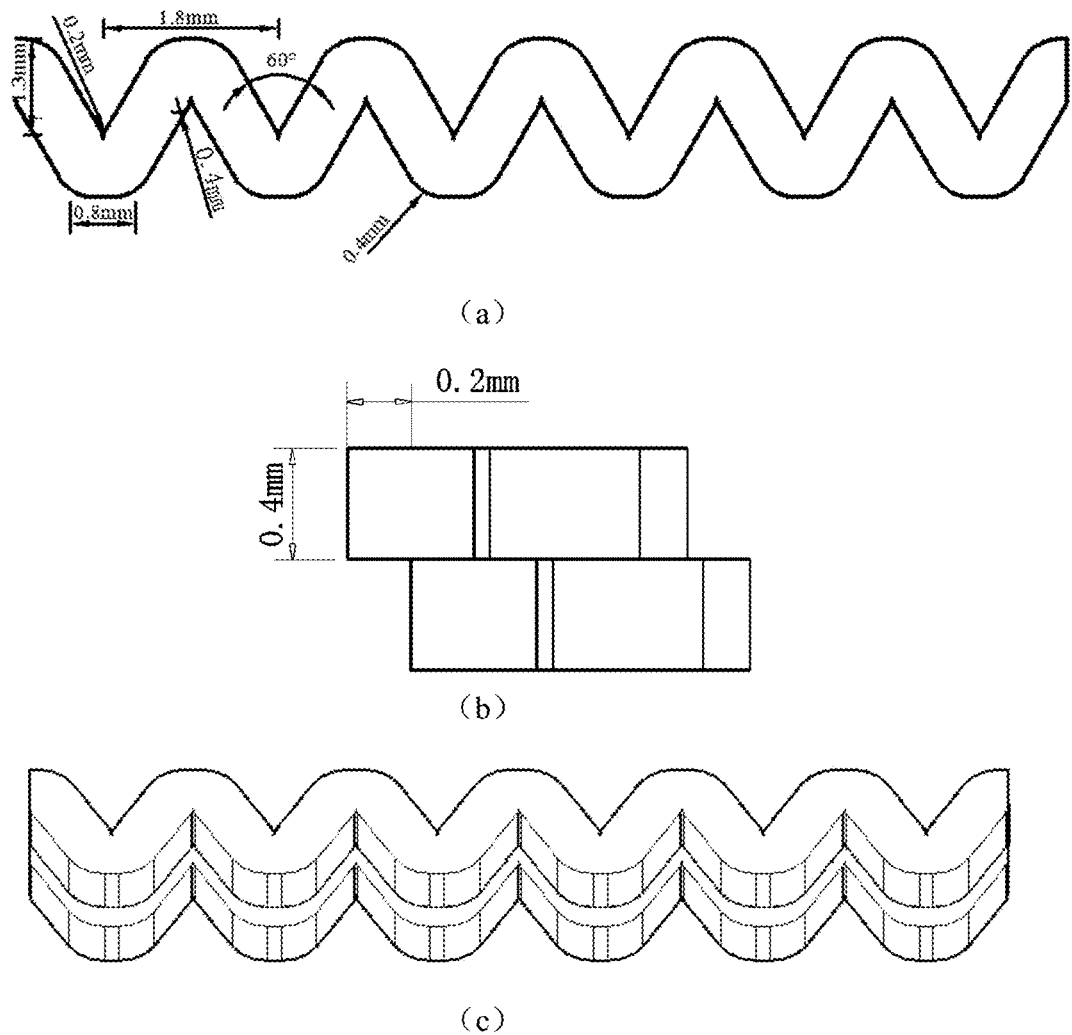
FIG. 5 is a schematic structural diagram of a flow-type thin wall drip irrigation belt with a double-layer asymmetric channel according to the present disclosure, where (a) is a top view, (b) is a left view, and (c) is a three dimensional view.

Finally, it is verified by flow that the structure parameters meet the requirements. The size of the channel structure after optimization of the structure parameters is shown in FIG. 5.

2. Design of Water Inlets 11 and Water Outlets 21

Figure 7:
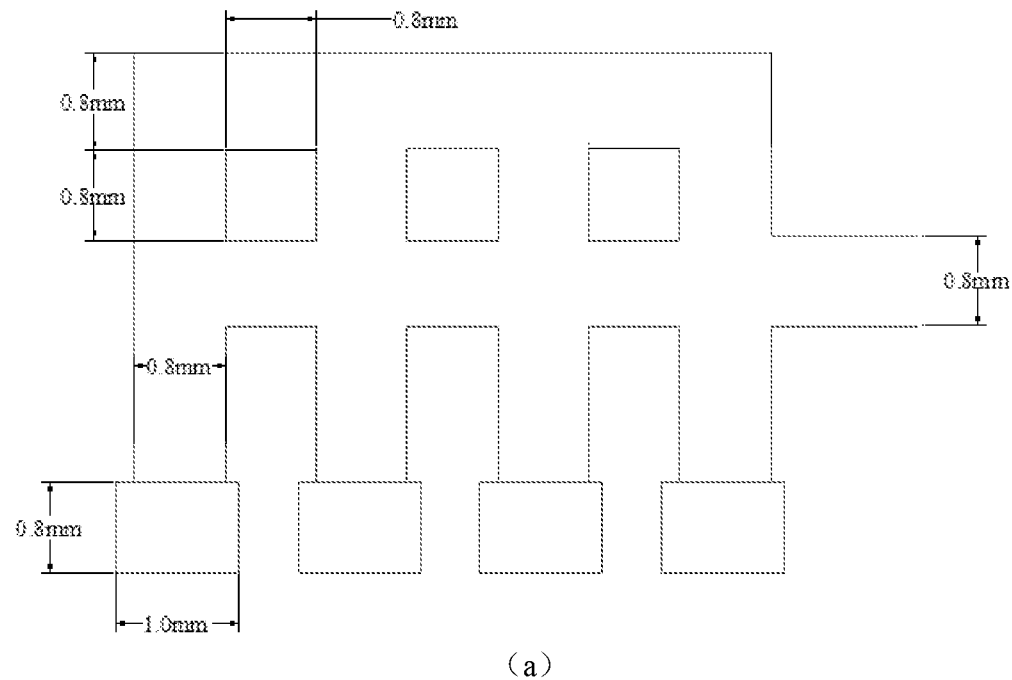
FIG. 7 is a schematic structural diagram of anti-negative pressure water outlets of a flow-type thin wall drip irrigation belt with a double-layer asymmetric channel according to the present disclosure, wherein (a) is a top view, (b) is a left view, and (c) is a front view.
Figure 7:
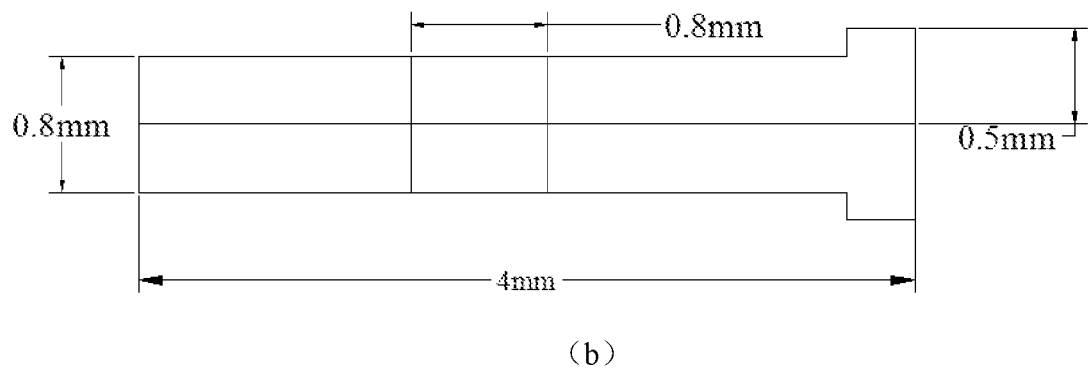
Figure 7:
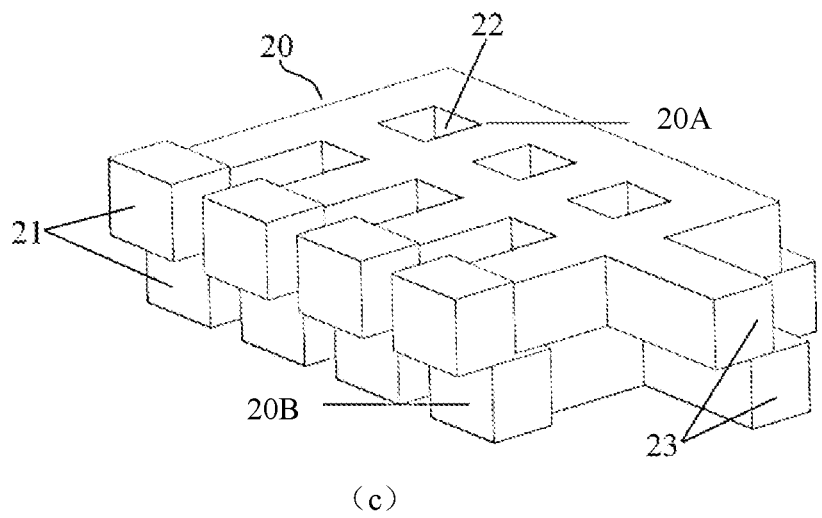

In this embodiment, the water inlets 11 are of double-layer asymmetric structures, the single water inlet 11 has a width of 0.6 mm and a height of 0.8 mm, and the structural sizes are as shown in FIG. 6. By adding anti-negative pressure structures at the water outlets 21, the size before abrupt change is 0.8×0.8 mm, while the size after abrupt change is 1.0×1.0 mm, and the structural sizes are as shown in FIG. 7.

Figure 8:
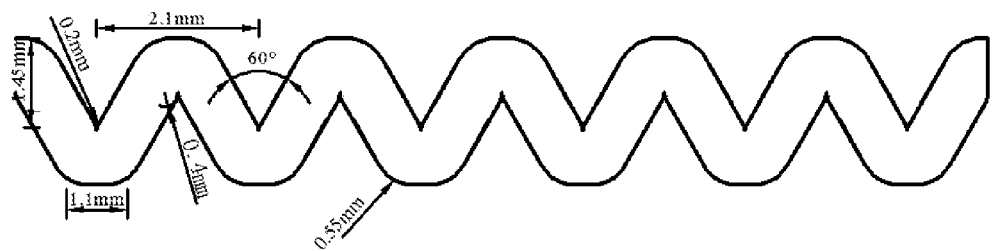
FIG. 8 is a structural schematic diagram of a molding wheel used in the forming method of a channel of flow-type thin wall drip irrigation belt according to the present disclosure, wherein (a) is a top view, (b) is a left view, and (c) is a three dimensional view.
Figure 8:
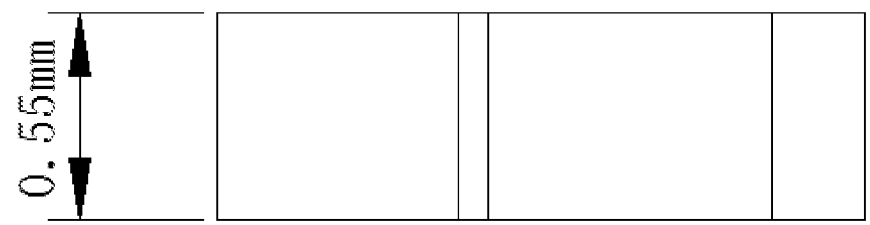
Figure 8:
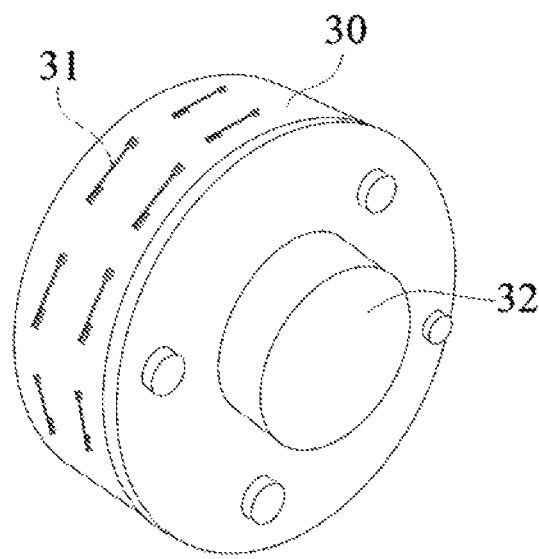

3. Structure Improvement of a Molding Wheel 30 and Calculation of Groove Channel Structure Parameters 1) Development of a Molding Wheel 30 and a Calculation Method for Groove Channel Structure Parameter Thereof In this embodiment, the wall thickness of the drip tape is selected to be 0.15 mm, and the size of the molding wheel channel is determined according to the calculation formulation of the straight segment structure size of the molding wheel channel, that is, the tooth height H is 1.45 mm, the tooth angle θ is 60°, the adjacent pitch S is 2.1 mm, the arc radius is 0.55 mm, the channel width d is 1.1 mm, the channel length L is 34.5 mm, and the channel depth d is 0.95 mm. The size structure of the improved molding wheel 30 is as shown in FIG. 8.

2) Determination of Unknown Vacuum Suction Points of Groove Channels

Figure 9:
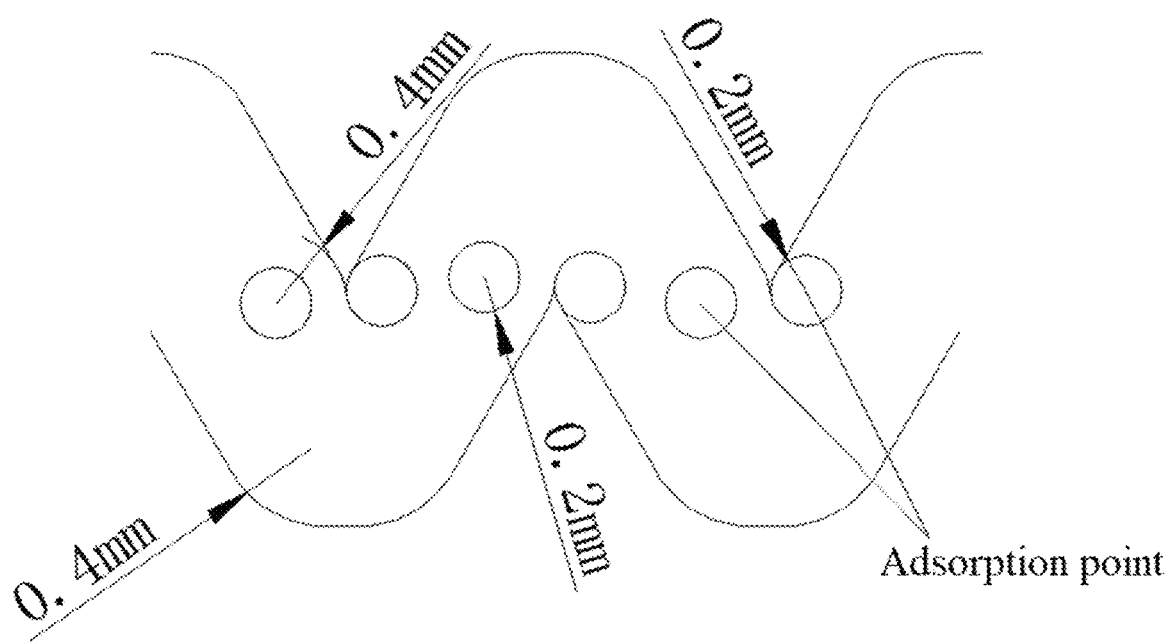
FIG. 9 is the arrangement of vacuum adsorption holes of the channel of flow-type thin wall drip irrigation belt according to the present disclosure.

Through different forms of contrast, finally, vacuum adsorption holes are arranged asymmetrically on two sides of the left and right arcs of the tooth tips, and the arrangement of vacuum adsorption holes at the center of tooth root arc is shown in FIG. 9, where the radii of the vacuum adsorption holes are 0.2 mm.

4. Material Modification and Design of a Reasonable Formulation

In order to realize the functions of low deformation, toughening, thinning and the like of the flow-type thin wall drip irrigation belt, a toughening and thinning master batch (POE), a compatibilizer (maleic anhydride graft) and an antioxidant (anti-UV agent) are added to the material formulation of the conventional drip tape. The improved material formulation includes 87.5-89.5% of bimodal high-density polyethylene polyethylene (DGDB2480H), 4.5-5.5% of toughening and thinning master batch (POE), 0.5% of compatibilizer (maleic anhydride graft), 2.0-3% of antioxidant (anti-UV agent), and 3.0% of black master batch.

5. Stereotyped Production

Based on the structure configuration, geometric parameters and boundary optimization form of the cast drip irrigation belt obtained above, the three-dimensional shaping of the flow-type drip irrigation belt was performed, finally a high-precision mold is finally developed according to user's application requirements, and key parameters of the drip tape such as materials and wall thickness are selected to realize industrialization of the drip tape.

Finally, it should be noted that, although the preferred embodiments of the present disclosure have been described above by examples, the scope of the present disclosure is not limited thereto. It could be understood by those skilled in the art that any modifications and variations shall fall into the protection scope of the present disclosure without departing from the essence taught by the present disclosure.

The invention claimed is:

1. A method of designing and forming a channel of flow-type thin wall drip irrigation belt, the method comprising:
   step 1: forming a double-layer asymmetric channel structure and determining control thresholds and optimal values of structure parameters of the channel structure;
   step 2: designing water inlets and water outlets of the double-layer asymmetric channel structure;
   step 3: determining a method of machining a molding wheel matching the double-layer asymmetric channel and optimization of a flow-type drip irrigation belt molding process;
   step 4: designing and modifying formulation materials of the flow-type drip irrigation belt including addition of a toughening master batch POE to the materials to enhance the toughness, addition of an anti-UV agent to the materials to improve the aging resistance, and addition of a compatibilizer to improve the uniformity and workability of the materials; and
   step 5: forming the flow-type drip irrigation belt;
   wherein the step 1 comprises model simulation and solution, forming an optimal channel structure;
   wherein the step 2 comprises designing self-cleaning water inlets and anti-negative suction water outlets; and
   wherein the step 3 comprises of improving the structure of the molding wheel and calculating groove channel structure parameters thereof, and determining positions of vacuum adsorption points of the groove channel;
   wherein improving the structure of the molding wheel comprises: addition of the same channel molding groove as the main channel to the side portion corresponding to the main channel of the molding wheel and adjustment of the degree of vacuum, thereby ensuring that the same channel is synchronously formed on one side wall corresponding to the main channel during molding.

2. The method according to claim 1, wherein the forming of the optimal channel structure in the step 1 comprises optimizing the arc on tooth tips of the channel structure and abrupt structural change portions at water outlets; the forming the optimal channel structure further comprises forming a double-layer asymmetric channel structure, that is, the arc-optimized channel structure is simulated by a numerical simulation method, the turbulence distribution is compared and the average turbulent kinetic energy is calculated, the channel structure with maximum turbulent region and average turbulent kinetic energy is selected, and two identical optimal channel structures are constructed as upper and lower structures, aligned on left and right and offset by ¼-½ of the channel width in front and back direction.

3. The method according to claim 2, wherein the determining control thresholds and optimal values of channel structure parameters in the step 1 comprises: comparison using a numerical simulation method to select the parameters of a unit segment of the inner wall of the sheared channel where the shear force is in the most unsuitable shear force interval (0-0.2 Pa∪0.4 Pa–∞) for growth of blocking matters and where the turbulence intensity is the highest based on optimized channel structure parameters, where the range of tooth height H is 1.3-1.6 mm, the range of tooth angle θ is 50°-60°, the range of adjacent tooth pitch S is 1.8-2.1 mm, the range of channel width d is 0.8-1.2 mm, the range of channel length L is 27.5-42.5 mm, the range of channel depth w is 0-1 mm, and the left arc radius $R_0$ of the tooth tip, the right arc radius $R_1$ of the tooth tip, the arc radius $R_2$ of the tooth root are all not less than 0.2 mm.

4. The method according to claim 3, wherein the tooth height H is 1.3 mm, the tooth angle θ is 60°, the adjacent tooth pitch S is 1.8 mm, the channel width d is 0.8 mm, the channel length L is 34.5 mm, the channel depth w is less than 0.8 mm, the left arc radius $R_0$ of the tooth tip is 0.4 mm, the right arc radius $R_1$ of the tooth tip is 0.2 mm, and the arc radius $R_2$ of the tooth root is 0.4 mm.

5. The method according to claim 2, wherein the determining positions of vacuum adsorption points of the groove channel in the step 3 comprises:
arrangement of the vacuum adsorption points at the positions where the turbulence intensity is the highest, that is, based on different radii of the arcs on the left and right sides of the tooth tip, the vacuum adsorption holes are arranged at centers of arcs on left and right sides, and the molding precision of the tooth tip is ensured by asymmetric adsorption; and in order to ensure the molding precision of the arc of the tooth root, the center of the adsorption hole is substantially at a center of the arc of the tooth root.

6. The method according to claim 1, wherein the designing self-cleaning water inlets in the step 2 comprises designing of double layers of asymmetric water inlets, the offset direction and distance of the water inlets are consistent with the channel part, each water inlet is ensured to be narrower than but as high as the channel, and the edges of the water inlets are connected with outside.

7. The method according to claim 1, wherein the designing anti-negative suction water outlets in the step 2 comprises designing of abrupt size change structures at the water outlets, such that the cross-sectional area of the water outlets increases to reduce the occurrence of blockage caused by negative pressure.

8. The method according to claim 1, wherein the calculation of groove channel structure parameters of the molding wheel in the step 3 comprises forming the structural size of a groove channel on the molding wheel, wherein
the formula for calculating the structural size of a straight segment of the molding wheel channel is:

$$L_1 = L_2 \pm 2B$$

in the formula, $L_1$ is the length size of the straight segment of the molding wheel, $L_2$ is the length size of the straight segment of the channel, and B is the wall thickness of the drip tape;
the formula for calculating the structural size of an arc segment of the molding wheel channel is:

$$R_3 = \begin{cases} R_4 + B & R_4 > 0.2 \text{ mm}) \\ 0.2 + B & R_4 < 0.2 \text{ mm}) \end{cases}$$

in the formula, $R_3$ is the radius size of the arc segment of the molding wheel, $R_4$ is the radius size of the arc segment of the channel, and B is the wall thickness of the drip tape.

9. The method according to claim 1, wherein the compatibilizer is a maleic anhydride graft.

* * * * *